UNITED STATES PATENT OFFICE.

JOHN JAMES STOCK, OF WATERTOWN, NEW YORK.

LUBRICANT.

SPECIFICATION forming part of Letters Patent No. 430,812, dated June 24, 1890.

Application filed March 8, 1890. Serial No. 343,101. (Specimens.)

*To all whom it may concern:*

Be it known that I, JOHN JAMES STOCK, of Watertown, in the county of Jefferson and State of New York, have invented a new and useful Improvement in Lubricating Compounds, of which the following is a specification.

The object of my invention is to provide a lubricating compound which shall be smoother in consistence and more effective in lubricating properties; and it consists in the following ingredients and method of compounding the same, viz: twenty-five pounds pulverized talc, (New York brand;) twenty-five pounds beef-tallow; one hundred and twenty pounds paraffine-oil; four quarts potash lye, (30° strength, Baumé's hydrometer;) two pounds vermilion red; two pounds oil mirbane. These ingredients are mixed together in a suitable vessel and boiled for thirty minutes. They are then taken off and stirred till cold. This compound is a reddish paste and may be used as a lubricant just as it is; but it is intended to be diluted or mixed with any other lubricating-oil in any desired proportion to bring it to the gravity or consistency desired.

Having thus described my invention, what I claim as new is—

A lubricating compound consisting of pulverized talc, beef-tallow, paraffine-oil, potash lye, vermilion red, and oil of mirbane, in or about the proportions described.

JOHN JAMES STOCK.

Witnesses:
GEO. H. WILDER,
LYMAN COLE.